US012552164B2

(12) United States Patent
Kiyose et al.

(10) Patent No.: US 12,552,164 B2
(45) Date of Patent: Feb. 17, 2026

(54) LIQUID DISCHARGE HEAD AND LIQUID DISCHARGE APPARATUS

(71) Applicant: SEIKO EPSON CORPORATION, Tokyo (JP)

(72) Inventors: Kei Kiyose, Shinagawa-ku (JP); Harunobu Koike, Matsumoto (JP); Takashi Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 174 days.

(21) Appl. No.: 18/596,765

(22) Filed: Mar. 6, 2024

(65) Prior Publication Data

US 2024/0300242 A1 Sep. 12, 2024

(30) Foreign Application Priority Data

Mar. 9, 2023 (JP) ................................ 2023-036503

(51) Int. Cl.
*B41J 2/14* (2006.01)
*B41J 2/16* (2006.01)

(52) U.S. Cl.
CPC ......... *B41J 2/14274* (2013.01); *B41J 2/1623* (2013.01)

(58) Field of Classification Search
CPC .... B41J 2/14274; B41J 2/1623; B41J 2/1646; B41J 2002/14241; B41J 2002/14419; B41J 2/14233
See application file for complete search history.

(56) References Cited

U.S. PATENT DOCUMENTS

2021/0031518 A1* 2/2021 Fujioka .................. B41J 2/1629
2022/0305772 A1 9/2022 Nagano

FOREIGN PATENT DOCUMENTS

JP 2022-152144 A 10/2022

* cited by examiner

*Primary Examiner* — Lisa Solomon
(74) *Attorney, Agent, or Firm* — WORKMAN NYDEGGER

(57) ABSTRACT

There is provided a liquid discharge head including: a piezoelectric element; a pressure chamber substrate provided with a pressure chamber; and a vibration plate configured to apply a pressure to a liquid in the pressure chamber, in which the vibration plate includes an elastic film and an insulating film, the elastic film is provided in each of an active region and an inactive region of the vibration plate, and the insulating film is provided in the active region of the vibration plate and is not provided in a part of the inactive region of the vibration plate, and $Y<4.0X+4800$, where a compressive stress is represented as a negative value, a tensile stress is represented as a positive value, a film stress of the insulating film is X [MPa], and a film stress of the elastic film is Y [MPa].

10 Claims, 8 Drawing Sheets

LIQUID DISCHARGE HEAD AND LIQUID DISCHARGE APPARATUS

The present application is based on, and claims priority from JP Application Serial Number 2023-036503, filed Mar. 9, 2023, the disclosure of which is hereby incorporated by reference herein in its entirety.

BACKGROUND

1. Technical Field

The present disclosure relates to a liquid discharge head and a liquid discharge apparatus.

2. Related Art

For example, as disclosed in JP-A-2022-152144, a liquid discharge head used in a liquid discharge apparatus typified by a piezo-type ink jet printer includes a vibration plate that configures a part of a wall surface of a pressure chamber that communicates with a nozzle discharging a liquid such as ink, and a piezoelectric element that vibrates the vibration plate. In JP-A-2022-152144, the vibration plate is in a state of being deflected toward the pressure chamber when the piezoelectric element is not driven.

As described in JP-A-2022-152144, in a configuration in which the vibration plate is in a state of being deflected toward the pressure chamber when the piezoelectric element is not driven, in a case where the deflection is excessively large, the displacement amount of the vibration plate reaches the limit even when an attempt is made to displace the vibration plate by driving the piezoelectric element. Therefore, in the related art, it is not possible to obtain sufficient displacement of the vibration plate, which may result in a decrease in the discharge efficiency of the liquid discharge head.

SUMMARY

According to an aspect of the present disclosure, there is provided a liquid discharge head including: a piezoelectric element having a first electrode, a piezoelectric body, and a second electrode; a pressure chamber substrate provided with a pressure chamber; and a vibration plate configured to apply a pressure to a liquid in the pressure chamber by vibrating when the piezoelectric element is driven, in which the pressure chamber substrate, the vibration plate, and the piezoelectric element are laminated in this order in a lamination direction, the vibration plate includes an elastic film provided on the pressure chamber substrate, and an insulating film provided between the elastic film and the piezoelectric element, when a part that overlaps the pressure chamber, the first electrode, the piezoelectric body, and the second electrode when viewed in the lamination direction is an active region and a part that overlaps the pressure chamber and is different from the active region when viewed in the lamination direction is an inactive region, in the vibration plate, the elastic film is provided in each of the active region and the inactive region, and the insulating film is provided in the active region and is not provided in a part of the inactive region, and $Y<4.0X+4800$, where a compressive stress is represented as a negative value, a tensile stress is represented as a positive value, a film stress of the insulating film is X [MPa], and a film stress of the elastic film is Y [MPa].

According to another aspect of the present disclosure, there is provided a liquid discharge apparatus including the liquid discharge head of the above aspect, and a control section configured to control driving of the liquid discharge head.

DESCRIPTION OF EMBODIMENTS

Figure 1:
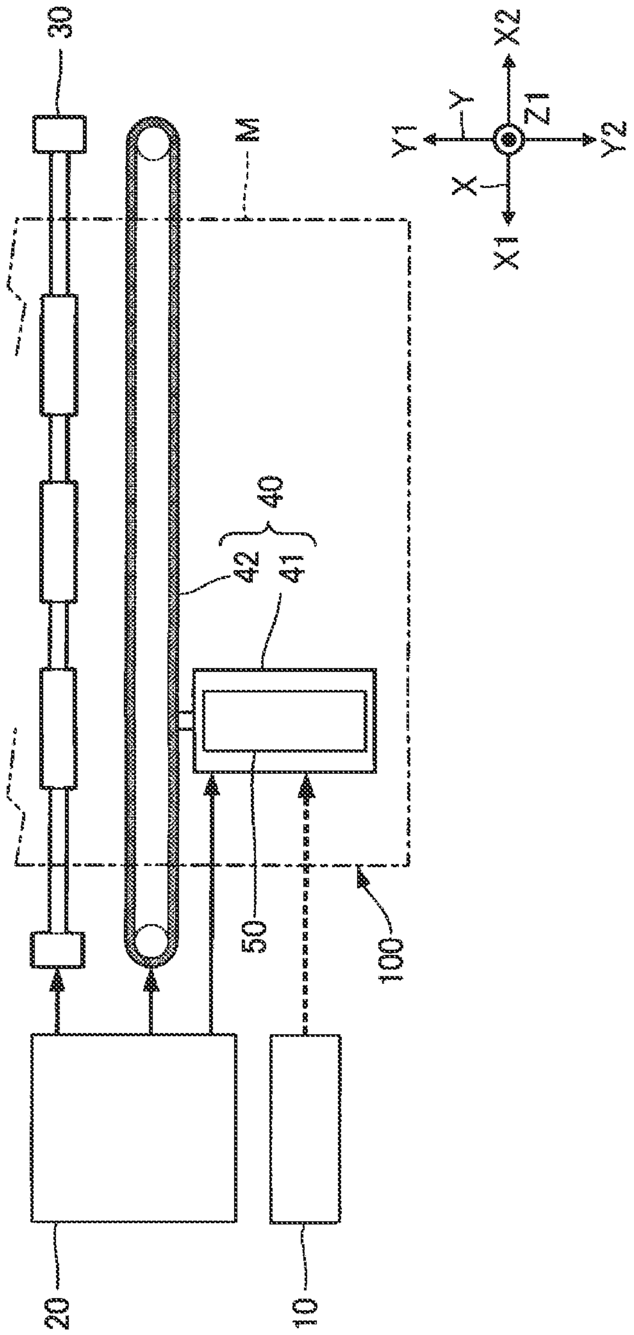
FIG. 1 is a configuration diagram schematically illustrating a liquid discharge apparatus according to an embodiment.

Hereinafter, preferred embodiments according to the present disclosure will be described with reference to the attached drawings. In the drawings, the dimensions and scale of each section may differ from the actual ones, and some parts are schematically illustrated for ease of understanding. Further, the scope of the present disclosure is not limited to these aspects unless otherwise stated to limit the disclosure in the following description.

The following description will be performed by using an X axis, a Y axis, and a Z axis that intersect each other as appropriate. In addition, hereinafter, one direction along the X axis is an X1 direction, and a direction opposite to the X1 direction is an X2 direction. Similarly, the directions opposite to each other along the Y axis are a Y1 direction and a Y2 direction. In addition, the directions opposite to each other along the Z axis are a Z1 direction and a Z2 direction. The Z1 direction is an example of a "lamination direction." In addition, viewing in a direction along the Z axis may be referred to as "plan view".

Here, typically, the Z axis is a vertical axis, and the Z2 direction corresponds to a vertically downward direction. However, the Z axis may not be the vertical axis. In addition, the X axis, the Y axis, and the Z axis are typically orthogonal to each other, but are not limited thereto, and may intersect each other at an angle within the range of 80° or more and 100° or less, for example.

1. Embodiment

1-1. Overall Configuration of Liquid Discharge Apparatus

FIG. 1 is a configuration diagram schematically illustrating a liquid discharge apparatus 100 according to an embodiment. The liquid discharge apparatus 100 is an ink jet printing apparatus that discharges ink, which is an example of a liquid, onto a medium M as a liquid droplet. The medium M is typically printing paper. The medium M is not limited to printing paper and may be a printing target of any material such as a resin film or cloth.

As illustrated in FIG. 1, the liquid discharge apparatus 100 includes a liquid container 10, a control unit 20 which is an example of a "control section", a transport mechanism 30, a movement mechanism 40, and a liquid discharge head 50.

The liquid container 10 is a container that stores ink. Examples of specific aspects of the liquid container 10 include a cartridge that can be attached to and detached from the liquid discharge apparatus 100, a bag-shaped ink pack made of a flexible film, and an ink tank that can be refilled with ink. A type of ink to be stored in the liquid container 10 is not particularly limited, and any type of ink may be selected.

The control unit 20 includes, for example, a processing circuit such as a central processing unit (CPU) or a field programmable gate array (FPGA) and a storage circuit such as a semiconductor memory, and controls the operation of each element of the liquid discharge apparatus 100. For example, the control unit 20 controls driving of the liquid discharge head 50. Accordingly, as will be described later, since the discharge characteristics of the liquid discharge head 50 are excellent, it is possible to provide the liquid discharge apparatus 100 having excellent discharge characteristics.

The transport mechanism 30 transports the medium M in the Y2 direction under the control of the control unit 20. The movement mechanism 40 reciprocates the liquid discharge head 50 in the X1 direction and the X2 direction under the control of the control unit 20. In the example illustrated in FIG. 1, the movement mechanism 40 includes a substantially box-shaped carriage 41 that accommodates the liquid discharge head 50, and a transport belt 42 to which the carriage 41 is fixed. The number of liquid discharge heads 50 mounted on the carriage 41 is not limited to one, and may be plural. In addition, the liquid container 10 described above may be mounted on the carriage 41 in addition to the liquid discharge head 50.

Under the control of the control unit 20, the liquid discharge head 50 discharges the ink supplied from the liquid container 10 toward the medium M from each of a plurality of nozzles in the Z2 direction. The discharge is performed in parallel with the transport of the medium M by the transport mechanism 30 and the reciprocating movement of the liquid discharge head 50 by the movement mechanism 40, and thus an image by ink is formed on the surface of the medium M. A configuration and a manufacturing method of the liquid discharge head 50 will be described in detail later.

1-2. Overall Configuration of Liquid Discharge Head

Figure 2:
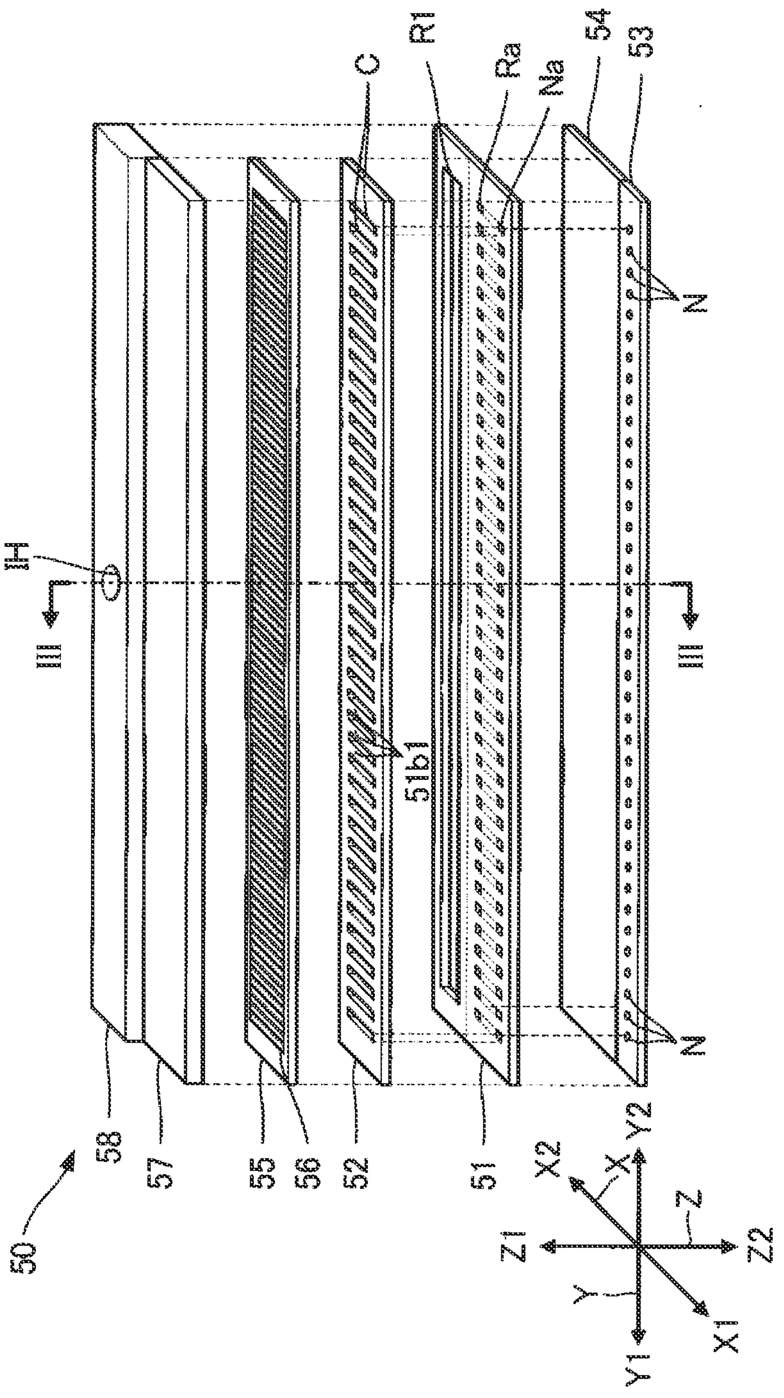
FIG. 2 is an exploded perspective view of a liquid discharge head according to the embodiment.
Figure 3:
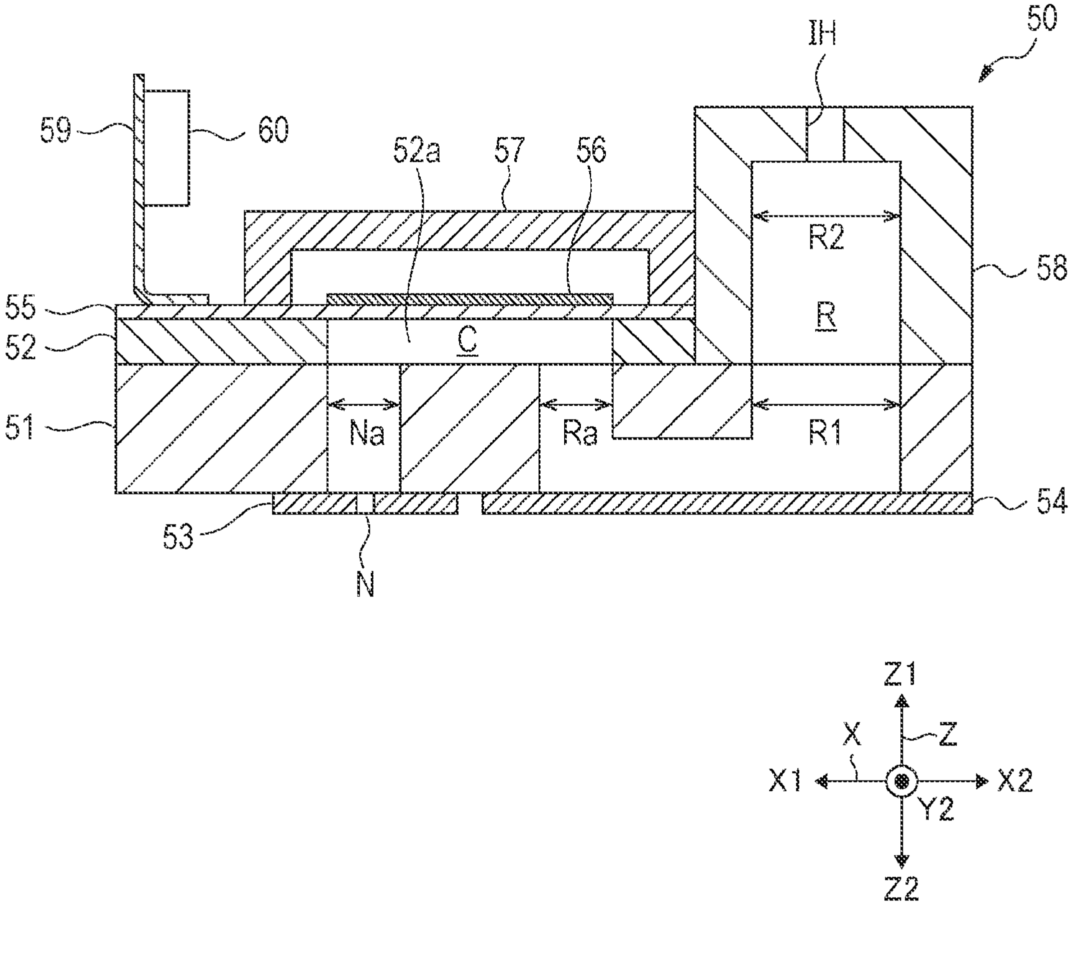
FIG. 3 is a cross-sectional view taken along the line III-III in FIG. 2.

FIG. 2 is an exploded perspective view of the liquid discharge head 50 according to the embodiment. FIG. 3 is a cross-sectional view taken along the line III-III in FIG. 2.

As illustrated in FIGS. 2 and 3, the liquid discharge head 50 includes a flow path substrate 51, a pressure chamber substrate 52, a nozzle substrate 53, a vibration absorber 54, a vibration plate 55, a plurality of piezoelectric elements 56, a sealing plate 57, a case 58, and a wiring substrate 59.

Here, the pressure chamber substrate 52, the vibration plate 55, the plurality of piezoelectric elements 56, the case 58, and the sealing plate 57 are installed in a region positioned in the Z1 direction with respect to the flow path substrate 51. On the other hand, the nozzle substrate 53 and the vibration absorber 54 are installed in the region positioned in the Z2 direction with respect to the flow path substrate 51. Each element of the liquid discharge head 50 is generally a plate-shaped member elongated in the direction along the Y axis, and is bonded to each other with an adhesive, for example.

As illustrated in FIG. 2, the nozzle substrate 53 is a plate-shaped member provided with a plurality of nozzles N arranged in a direction along the Y axis. Each nozzle Nis a through-hole through which ink passes. The nozzle substrate 53 is manufactured by processing a silicon single crystal substrate by, for example, a semiconductor manufacturing technology using a processing technology such as dry etching or wet etching. Note that other known methods and materials may be appropriately used for manufacturing the nozzle substrate 53.

The flow path substrate 51 is a plate-shaped member for forming a flow path for ink. As illustrated in FIGS. 2 and 3, the flow path substrate 51 is provided with an opening portion R1, a plurality of supply flow paths Ra, and a plurality of communication flow paths Na. The opening portion R1 is an elongated through-hole extending in the direction along the Y axis to be continuous over the plurality of nozzles N in plan view viewed in the direction along the Z axis. On the other hand, each of the supply flow path Ra and the communication flow path Na is a through-hole provided for each nozzle N individually. Each of the plurality of supply flow paths Ra communicates with the opening portion R1. The flow path substrate 51 is manufactured by processing a silicon single crystal substrate by, for example, a semiconductor manufacturing technology, similarly to the nozzle substrate 53 described above. However, other known methods and materials may be appropriately used for manufacturing the flow path substrate 51.

The pressure chamber substrate 52 is a plate-shaped member in which a plurality of pressure chambers C corresponding to the plurality of nozzles N are formed. The pressure chamber C is positioned between the flow path substrate 51 and the vibration plate 55, and is a space called a cavity for applying a pressure to the ink that fills the pressure chamber C. The plurality of pressure chambers C are arranged in the direction along the Y axis. Each pressure chamber C includes holes 52*a* that open on both surfaces of the pressure chamber substrate 52, and has an elongated shape extending in the direction along the X axis. The end of each pressure chamber C in the X2 direction communicates with the corresponding supply flow path Ra. On the other hand, the end of each pressure chamber C in the X1 direction communicates with the corresponding communication flow path Na. The pressure chamber substrate 52 is manufactured by processing a silicon single crystal substrate by, for example, a semiconductor manufacturing technology, similarly to the nozzle substrate 53 described above. However, other known methods and materials may be appropriately used for manufacturing each of the pressure chamber substrates 52.

The vibration plate 55 is disposed on a surface of the pressure chamber substrate 52 facing the Z1 direction. The vibration plate 55 is a plate-shaped member that is elastically deformable. The details of the vibration plate 55 will be described later with reference to FIG. 5.

The plurality of piezoelectric elements 56 corresponding to nozzles N or pressure chambers C, which are different from each other, are disposed on a surface of the vibration plate 55 facing the Z1 direction. Each piezoelectric element 56 is a passive element that is deformed by the supply of a drive signal, and has an elongated shape extending in a direction along the X axis. The plurality of piezoelectric elements 56 are arranged in a direction along the Y axis to correspond to the plurality of pressure chambers C. When the vibration plate 55 vibrates in conjunction with the deformation of the piezoelectric element 56, the pressure in the pressure chamber C fluctuates, and accordingly, ink is discharged from the nozzle N. The details of the piezoelectric element 56 will be described later with reference to FIGS. 4 and 5.

The case 58 is a case for storing ink supplied to the plurality of pressure chambers C, and is bonded to a surface of the flow path substrate 51 facing the Z1 direction with an adhesive or the like. The case 58 is made of, for example, a resin material and manufactured by injection molding. The case 58 is provided with an accommodation section R2 and an inlet IH. The accommodation section R2 is a recess portion having an outer shape corresponding to the opening portion R1 of the flow path substrate 51. The inlet IH is a through-hole that communicates with the accommodation section R2. A space defined by the opening portion R1 and the accommodation section R2 functions as a liquid storage chamber R, which is a reservoir for storing ink. The ink from the liquid container 10 is supplied to the liquid storage chamber R through the inlet IH.

The vibration absorber 54 is an element for absorbing the pressure fluctuation in the liquid storage chamber R. The vibration absorber 54 is, for example, a compliance substrate which is a flexible sheet member that can be elastically deformed. Here, the vibration absorber 54 is disposed on the surface of the flow path substrate 51 facing the Z2 direction to block the opening portion R1 of the flow path substrate 51 and the plurality of supply flow paths Ra to configure the bottom surface of the liquid storage chamber R.

The sealing plate 57 is a structure that protects the plurality of piezoelectric elements 56 and reinforces the mechanical strength of the pressure chamber substrate 52 and the vibration plate 55. The sealing plate 57 is bonded to the surface of the vibration plate 55 with, for example, an adhesive. The sealing plate 57 is provided with a recess portion for accommodating the plurality of piezoelectric elements 56.

The wiring substrate 59 is bonded to the surface of the pressure chamber substrate 52 or the vibration plate 55 facing the Z1 direction. The wiring substrate 59 is a mounting component on which a plurality of wirings for electrically couple the control unit 20 and the liquid discharge head 50 are formed. The wiring substrate 59 is, for example, a flexible wiring substrate such as a flexible printed circuit (FPC) or a flexible flat cable (FFC). A drive circuit 60 for driving the piezoelectric element 56 is mounted on the wiring substrate 59. The drive circuit 60 selectively supplies a drive signal for driving each piezoelectric element 56 to each piezoelectric element 56 via the wiring substrate 59.

As described above, the liquid discharge head 50 includes the piezoelectric elements 56, the pressure chamber substrate 52 provided with the pressure chambers C communicating with the nozzles N, and the vibration plate 55 that applies a pressure to a liquid in the pressure chamber C by vibrating when the piezoelectric element 56 is driven. Here, as described above, the pressure chamber substrate 52, the vibration plate 55, and the piezoelectric element 56 are laminated in this order in the Z1 direction.

1-3. Details of Vibration Plate and Piezoelectric Element

Figure 4:
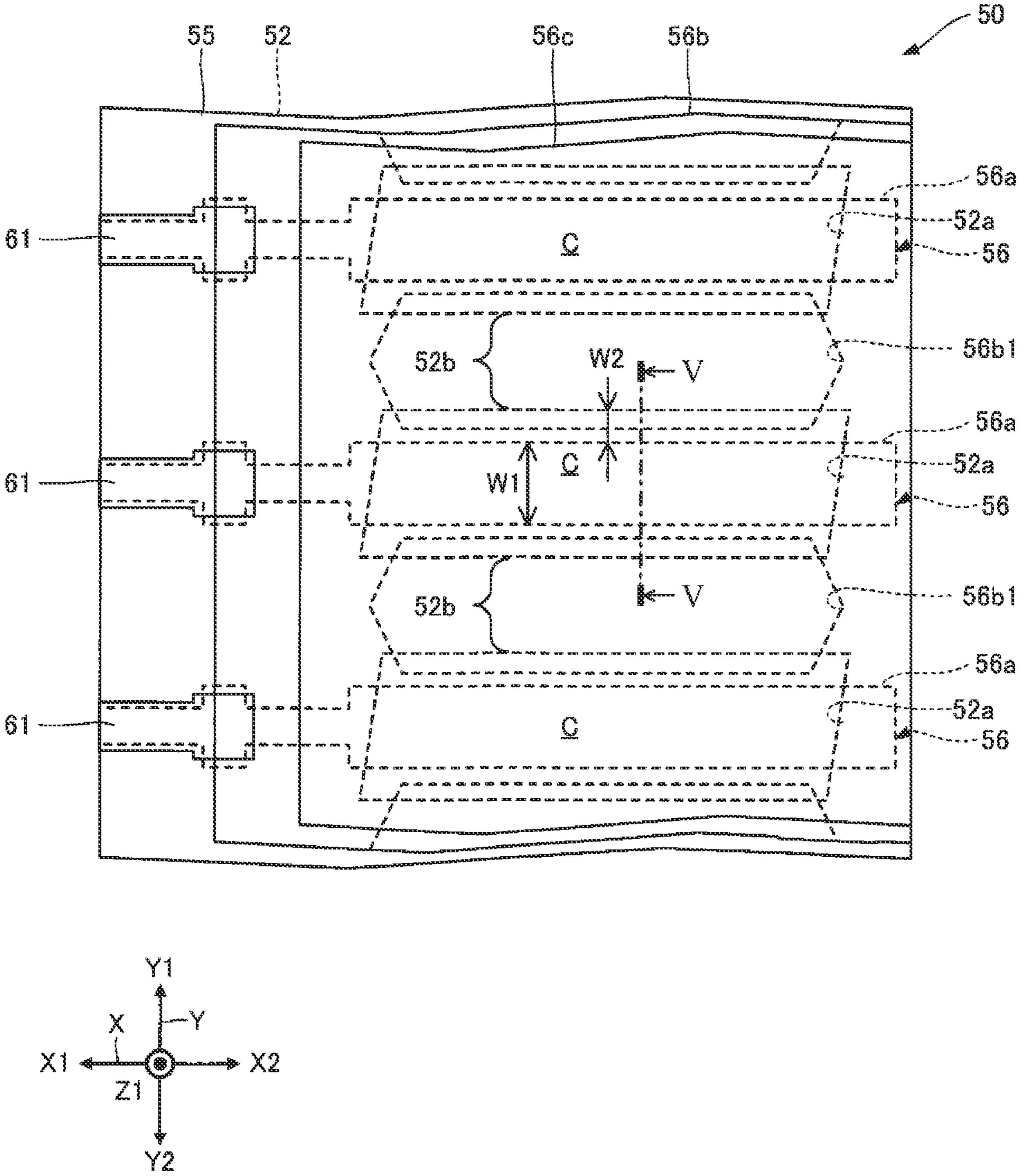
FIG. 4 is a plan view illustrating a part of a liquid discharge head according to the embodiment.
Figure 5:
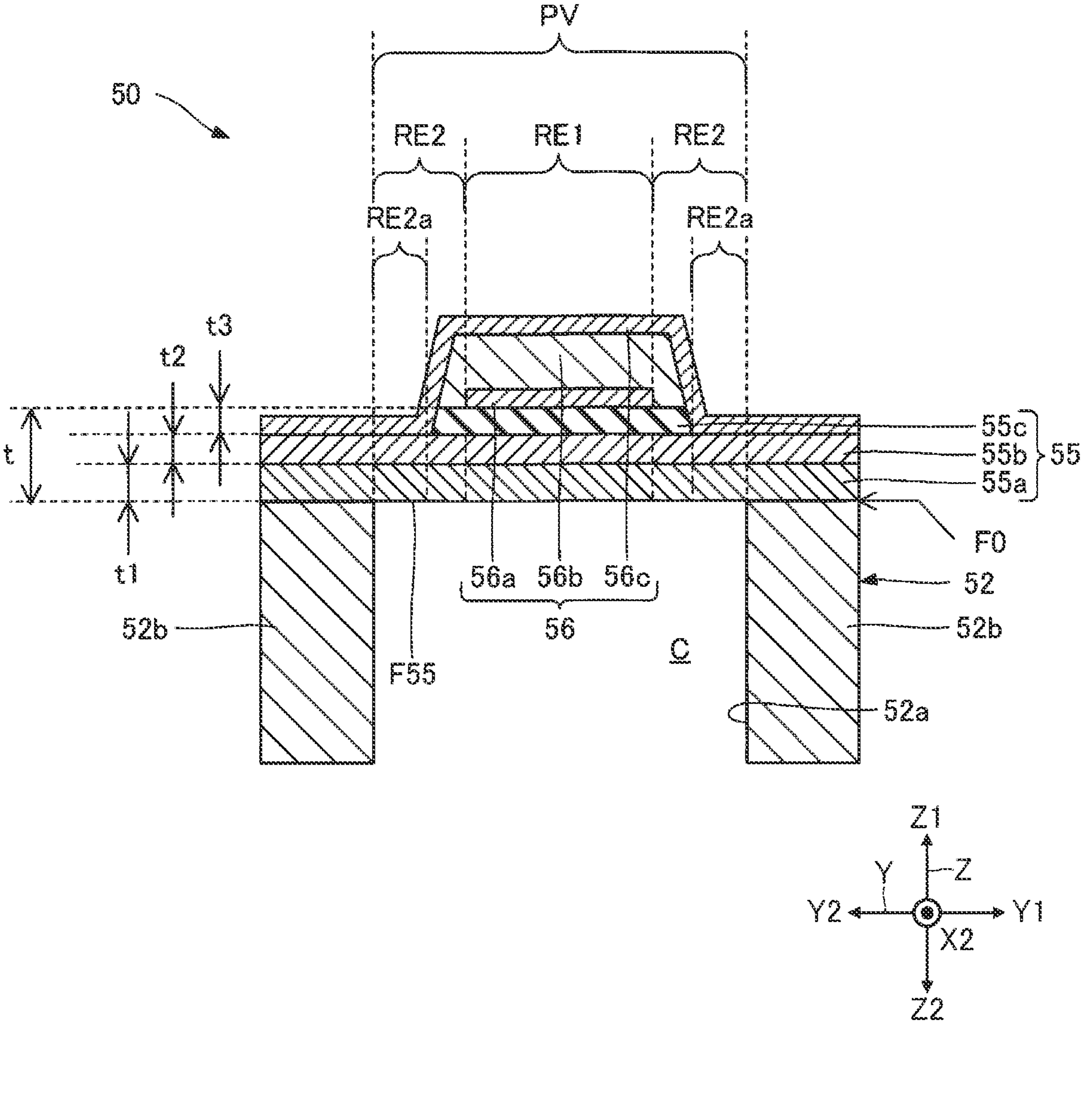
FIG. 5 is a cross-sectional view taken along the line V-V in FIG. 4.

FIG. 4 is a plan view illustrating a part of the liquid discharge head 50 according to the embodiment. FIG. 5 is a cross-sectional view taken along the line V-V in FIG. 4. Hereinafter, the pressure chamber substrate 52, the piezoelectric element 56, and the vibration plate 55 will be described in this order with reference to FIGS. 4 and 5. In FIG. 5, for convenience of description, an initial deflection, which will be described later, which is also referred to as a 0 V deflection of the vibration plate 55 is omitted. The initial deflection will be described later with reference to FIGS. 6 and 7.

As illustrated in FIGS. 4 and 5, the pressure chamber substrate 52 is provided with the holes 52*a* that configures the pressure chamber C. Accordingly, the pressure chamber substrate 52 is provided with a wall-shaped partition wall 52*b* extending in the direction along the X axis between two holes 52*a* adjacent to each other. The pressure chamber substrate 52 is manufactured, for example, by processing a silicon single crystal substrate using a semiconductor manufacturing technology. In FIG. 4, the plan view shape of the hole 52*a* when the hole 52*a* is formed on a silicon single crystal substrate having a plane orientation (110) by anisotropic etching is indicated by a broken line. The plan view shape of the hole 52*a* is not limited to the example illustrated in FIG. 4, and any shape may be selected.

Here, the formation of the pressure chamber C is performed after the formation of the piezoelectric element 56. The pressure chamber C is formed by, for example, anisotropic etching on a surface of both surfaces of the silicon single crystal substrate after the formation of the piezoelectric element 56, which is different from the surface on which the piezoelectric element 56 is formed. For example, a potassium hydroxide aqueous solution (KOH) or the like is used as the etching solution for the anisotropic etching. In addition, at this time, when the elastic film 55*a* is made of silicon oxide, the elastic film 55*a* functions as a stop layer for stopping the anisotropic etching. After the formation of the pressure chamber C described above, the flow path substrate 51 and the like are bonded to the pressure chamber substrate 52 with an adhesive. After the formation of the piezoelectric element 56, if necessary, a surface opposite to a surface, on which the piezoelectric element 56 is formed, of both surfaces of the silicon single crystal substrate is ground by chemical mechanical polishing (CMP) or the like to flatten the surface or to adjust the thickness of the substrate.

As illustrated in FIG. 4, the piezoelectric element 56 overlaps the pressure chamber C in plan view. As illustrated in FIG. 5, the piezoelectric element 56 includes a first electrode 56*a*, a piezoelectric body 56*b*, and a second electrode 56*c*, which are laminated in this order in the Z1 direction. The piezoelectric element 56 may have a configuration in which electrodes and piezoelectric body layers are alternately laminated in a multi-layered manner and expand and contract toward the vibration plate 55 between the first electrode 56*a* and the second electrode 56*c*. In addition, another layer such as a layer for enhancing adhesion may be appropriately interposed between the layers of the piezoelectric element 56 or between the piezoelectric element 56 and the vibration plate 55.

The first electrodes 56*a* are individual electrodes disposed to be separated from each other for the respective piezoelectric elements 56. Specifically, a plurality of first electrodes 56*a* extending in the direction along the X axis are arranged in the direction along the Y axis at intervals from each other. A drive signal including a predetermined voltage pulse is supplied from the control unit 20 to the first electrode 56*a* of each of the piezoelectric elements 56.

The first electrode 56*a* includes, for example, a layer made of iridium (Ir) and a layer made of titanium (Ti), which are laminated in this order in the Z1 direction. Here, iridium is an electrode material having excellent conductivity. Therefore, by using iridium as the constituent material of the first electrode 56$a$, the low resistance of the first electrode 56$a$ can be achieved. Further, in the layer made of titanium, when the piezoelectric body 56$b$ is formed, the island-shaped Ti becomes crystal nuclei to control the orientation of the piezoelectric body 56$b$, and enhance the crystallinity or orientation of the piezoelectric body 56$b$. In addition, instead of the layer made of iridium, or in addition to the layer, a layer made of another metal material may be provided.

In the example illustrated in FIGS. 4 and 5, the piezoelectric body 56$b$ has a band shape extending in the direction along the Y axis to be continuous over the plurality of piezoelectric elements 56. In the example illustrated in FIG. 4, the piezoelectric body 56$b$ is provided with a through-hole 56$b$1 penetrating the piezoelectric body 56$b$ extending in the direction along the X axis in a region corresponding to the gap between the pressure chambers C adjacent to each other in plan view. As a result, the piezoelectric body 56$b$ is individually provided for each piezoelectric element 56 when viewed in the cross section illustrated in FIG. 4. The piezoelectric body 56$b$ may be individually provided on the plurality of piezoelectric elements 56.

The piezoelectric body 56$b$ is made of a piezoelectric material having a perovskite-type crystal structure represented by the general composition formula $ABO_3$. Specifically, the material that forms the piezoelectric body 56$b$ is a piezoelectric material containing one or two or more elements selected from lead (Pb), titanium (Ti), zirconium (Zr), potassium (K), sodium (Na), niobium (Nb), barium (Ba), iron (Fe), bismuth (Bi), tantalum (Ta), chromium (Cr), iridium (Ir), hafnium (Hf), lithium (Li), carbon (C), and lanthanum (La). Examples of the piezoelectric material include barium titanate ($BaTiO_3$), lead zirconate titanate ($Pb(Zr,Ti)O_3$), and potassium niobate ($K,Na)NbO_3$), and is not particularly limited.

The second electrode 56$c$ is a band-shaped common electrode extending in the direction along the Y axis to be continuous over the plurality of piezoelectric elements 56. A predetermined constant potential is supplied to the second electrode 56$c$.

The second electrode 56$c$ is made of, for example, iridium (Ir). The constituent material of the second electrode 56$c$ is not limited to iridium and may be metal materials such as platinum (Pt), aluminum (Al), nickel (Ni), gold (Au), and copper (Cu). Further, the second electrode 56$c$ may be configured by using one of these metal materials alone, or may be configured by using two or more of these metal materials in combination in the form of a lamination or the like.

The first electrode 56$a$, the piezoelectric body 56$b$, and the second electrode 56$c$ described above are obtained by forming a film on the vibration plate 55 in this order. Each of the first electrode 56$a$ and the second electrode 56$c$ is formed by, for example, a known film forming technology such as a sputtering method, and a known processing technology using photolithography, etching, or the like. For the piezoelectric body 56$b$, for example, a precursor layer of the piezoelectric body 56$b$ is formed by a sol-gel method, and the precursor layer is fired and crystallized to form the piezoelectric body 56$b$. Further, the piezoelectric body 56$b$ is subjected to polarization processing by applying a voltage between the first electrode 56$a$ and the second electrode 56$c$.

In the above piezoelectric element 56, the piezoelectric body 56$b$ is deformed by an inverse piezoelectric effect by applying a voltage between the first electrode 56$a$ and the second electrode 56$c$. The vibration plate 55 vibrates in accordance with this deformation.

As illustrated in FIG. 5, the vibration plate 55 has an elastic film 55$a$, an adhesion film 55$b$, and an insulating film 55$c$, and these films are laminated in the Z1 direction in this order. Here, the elastic film 55$a$ is provided on the pressure chamber substrate 52. The insulating film 55$c$ is provided between the elastic film 55$a$ and the piezoelectric element 56. The adhesion film 55$b$ is provided between the elastic film 55$a$ and the insulating film 55$c$.

In FIG. 5, for convenience of description, the interface between the layers that configure the vibration plate 55 is clearly illustrated, but the interface may not be clear, and for example, the constituent materials of the two layers may be mixed in the vicinity of the interface between the two layers adjacent to each other. In addition, the adhesion film 55$b$ may be provided, if necessary, and omitted.

The elastic film 55$a$ is, for example, a film made of silicon oxide ($SiO_2$). However, the material that forms the elastic film 55$a$ is not limited to $SiO_2$ as long as the film stress of the elastic film 55$a$ and the film stress of the insulating film 55$c$ can satisfy the relation described later.

Specifically, the material that forms the elastic film 55$a$ may be a material containing one or two or more elements selected from titanium (Ti), silicon (Si), aluminum (Al), tantalum (Ta), chromium (Cr), iridium (Ir), hafnium (Hf), zirconium (Zr), and carbon (C), as any of a simple substance, an oxide, or a nitride. By using such a material, it is possible to easily satisfy the relation described later between the film stress of the elastic film 55$a$ and the film stress of the insulating film 55$c$ while realizing the elasticity required for the elastic film 55$a$. In addition, the elastic film 55$a$ may be configured of a single layer, or may be configured of a plurality of laminated layers made of the same material, for example. The elastic film 55$a$ and the insulating film 55$c$ are preferably made of materials different from each other.

A thickness t1 of the elastic film 55$a$ is determined according to a thickness t and a width of the vibration plate 55, is not particularly limited, and is preferably in the range of 100 nm or more and 3000 nm or less, and more preferably in the range of 500 nm or more and 2500 nm or less.

The insulating film 55$c$ is a film made of zirconium oxide ($ZrO_2$), for example. However, the material that forms the insulating film 55$c$ is not limited to $ZrO_2$ as long as the film stress of the elastic film 55$a$ and the film stress of the insulating film 55$c$ can satisfy the relation described later.

Specifically, the material that forms the insulating film 55$c$ may be a material containing one or two or more elements selected from titanium (Ti), silicon (Si), aluminum (Al), tantalum (Ta), chromium (Cr), iridium (Ir), hafnium (Hf), zirconium (Zr), carbon (C), and lead (Pb), as any of an oxide or a nitride, and from the viewpoint of easily increasing the orientation rate of the piezoelectric body 56$b$, $ZrO_X$, $PbTiO_X$, $TIO_X$, and ((Pb,Bi)(Fe, Ti)Ox) are preferable. By using such a material, it is possible to easily satisfy the relation described later between the film stress of the elastic film 55$a$ and the film stress of the insulating film 55$c$ while realizing the insulating property required for the insulating film 55$c$. In addition, the insulating film 55$c$ may be configured of a single layer or may be made of a plurality of laminated layers.

A thickness t3 of the insulating film 55$c$ is determined according to the thickness t and the width of the vibration plate 55, is not particularly limited, and is, for example, within the range of 100 nm or more and 2000 nm or less. Here, the thickness t3 of the insulating film 55$c$ is preferably thinner than the thickness t1 of the elastic film 55$a$. Since the thickness t3 of the insulating film 55$c$ is thinner than the thickness t1 of the elastic film 55$a$, it is possible to easily satisfy the relation described later between the film stress of the elastic film 55*a* and the film stress of the insulating film 55*c*.

However, the thickness t3 of the insulating film 55*c* may be equal to or greater than the thickness t1 of the elastic film 55*a*. Even in this case, by appropriately adjusting the process conditions such as the film formation method or the annealing temperature of each film, it is possible to satisfy the relation described later between the film stress of the elastic film 55*a* and the film stress of the insulating film 55*c*.

The adhesion film 55*b* is interposed between the elastic film 55*a* and the insulating film 55*c* described above. Therefore, the adhesion between the elastic film 55*a* and the insulating film 55*c* can be enhanced. In addition, the adhesion film 55*b* prevents the elastic film 55*a* and the insulating film 55*c* from coming into contact with each other. Therefore, when the elastic film 55*a* is made of silicon oxide and the insulating film 55*c* is made of zirconium oxide, the reduction of the silicon oxide in the elastic film 55*a* by the zirconium in the insulating film 55*c* is reduced.

The adhesion film 55*b* is a film that enhances the adhesion between the elastic film 55*a* and the insulating film 55*c*, and is made of a material different from that of the elastic film 55*a* and the insulating film 55*c*. Specifically, the material that forms the adhesion film 55*b* may be a material containing one or two or more elements selected from titanium (Ti), silicon (Si), aluminum (Al), tantalum (Ta), chromium (Cr), iridium (Ir), hafnium (Hf), zirconium (Zr), and carbon (C), as any of a simple substance, an oxide, or a nitride, and from the viewpoint of high moisture prevention effect, $TiO_X$, $AlO_X$, $CrO_X$, and TiN are preferable. By using such a material, it is possible to easily satisfy the relation described later between the film stress of the elastic film 55*a* or the insulating film 55*c* and the film stress of the adhesion film 55*b* while realizing the characteristics required for the adhesion film 55*b*. Further, the adhesion film 55*b* may be configured of a single layer or may be made of a plurality of laminated layers.

The thickness t2 of the adhesion film 55*b* is determined according to the thickness t and the width of the vibration plate 55, is not particularly limited, and is, for example, within the range of 20 nm or more and 2000 nm or less. In this case, there is an advantage that the characteristics of the vibration plate 55 can be easily optimized. Here, the thickness t2 of the adhesion film 55*b* is preferably thinner than each of the thickness t1 of the elastic film 55*a* and the thickness t3 of the insulating film 55*c*. Since the thickness t2 of the adhesion film 55*b* is thinner than the thickness t3 of the insulating film 55*c*, it is possible to easily satisfy the relation described later between the film stress of the insulating film 55*c* and the film stress of the adhesion film 55*b*.

However, the thickness t2 of the adhesion film 55*b* may be equal to or greater than the thickness t3 of the insulating film 55*c*. Even in this case, by appropriately adjusting the process conditions such as the film formation method or the annealing temperature of each film, it is possible to satisfy the relation described later between the film stress of the elastic film 55*a* and the film stress of the insulating film 55*c*.

The elastic film 55*a*, the adhesion film 55*b*, and the insulating film 55*c* described above are obtained by being formed in this order on the silicon single crystal substrate for forming the pressure chamber substrate 52. For example, when the elastic film 55*a* is made of silicon oxide, the elastic film 55*a* is formed by thermally oxidizing one surface of the silicon single crystal substrate. For example, when the adhesion film 55*b* is made of an oxide of chromium, titanium, or aluminum, the adhesion film 55*b* forms a layer of chromium, titanium, or aluminum on the elastic film 55*a* by a sputtering method, and the layer is formed by thermal oxidation. For example, when the insulating film 55*c* is made of zirconium oxide, the insulating film 55*c* forms a layer of zirconium by a sputtering method on the adhesion film 55*b*, and the layer is formed by thermal oxidation.

The method of forming each of the plurality of films that configures the vibration plate 55 is not limited to the above-described example, and any method may be selected. For example, a CVD method or the like may be used for the formation of at least a part of the elastic film 55*a*. Further, the formation of the adhesion film 55*b* is not limited to the method using thermal oxidation, and for example, a CVD method, an atomic layer deposition (ALD) method, or the like may be used. Further, the thermal oxidation for forming the adhesion film 55*b* and the insulating film 55*c* may be performed collectively.

The above-described vibration plate 55 has a vibration region PV that vibrates by the driving of the piezoelectric element 56. The vibration region PV is a part of the vibration plate 55 that overlaps the pressure chamber C in plan view. Here, while each of the elastic film 55*a* and the adhesion film 55*b* described above is provided over the entire vibration region PV when viewed in the direction along the Z axis, the above-described insulating film 55*c* is provided at a part of the vibration region PV when viewed in the direction along the Z axis.

Specifically, in the description, the vibration region PV is divided into an active region RE1 and an inactive region RE2. The active region RE1 is a part of the vibration plate 55 that overlaps the pressure chamber C, the first electrode 56*a*, the piezoelectric body 56*b*, and the second electrode 56*c* when viewed in the direction along the Z axis. The active region RE1 is provided with the elastic film 55*a*, the adhesion film 55*b*, and the insulating film 55*c*. The inactive region RE2 is a part that overlaps the pressure chamber C and is different from the active region RE1 in the vibration plate 55 when viewed in the direction along the Z axis. In at least a part of the inactive region RE2, the elastic film 55*a* and the adhesion film 55*b* are provided, and the insulating film 55*c* is not provided.

As described above, while each of the elastic film 55*a* and the adhesion film 55*b* is provided in each of the active region RE1 and the inactive region RE2, the insulating film 55*c* is provided in the active region RE1 and is not provided in at least a part of the inactive region RE2.

In the example illustrated in FIG. 5, the inactive region RE2 has an arm portion RE2*a*. The arm portion RE2*a* is a part of the vibration plate 55 that does not overlap the piezoelectric body 56*b* and overlaps the pressure chamber C between the active region RE1 and the end of the pressure chamber C in the width direction when viewed in the direction along the Z axis. In the arm portion RE2*a*, the elastic film 55*a* and the adhesion film 55*b* are provided, and the insulating film 55*c* is not provided.

Since the vibration plate 55 has the arm portion RE2*a* in this manner, the vibration plate 55 can be easily deflected in the thickness direction as compared with the aspect in which the arm portion RE2*a* is not included. Therefore, the displacement efficiency of the vibration plate 55 can be improved by driving the piezoelectric element 56.

The insulating film 55*c* may not be provided over the entire range of the inactive region RE2 viewed in the direction along the Z axis. In addition, the adhesion film 55*b* may not be provided on the arm portion RE2*a*. However, since the adhesion film 55*b* is provided on the arm portion RE2*a*, the elastic film 55*a* can be covered with the adhesion film 55*b* over the entire vibration region PV. Therefore, the adhesion film 55*b* can protect the elastic film 55*a* from moisture and the like.

When the vibration plate 55 has the inactive region RE2 as described above, since the strength of the inactive region RE2 is weaker than the strength of the active region RE1, cracks in the vibration plate 55 are likely to occur. In particular, when the thickness of the vibration plate is 5 μm or less, the strength of the vibration plate 55 becomes weak, and thus cracks in the vibration plate 55 are likely to occur.

In the related art, from the viewpoint of preventing the occurrence of cracks in the vibration plate 55, a design was made under the concept that it is better to reduce the stress difference between the elastic film 55*a* and the insulating film 55*c* as much as possible. Under such a design concept, the stress balance of the entire vibration plate 55 is unintentionally lost, and as a result, a problem that tends to occur is that the deflection amount of the vibration plate 55 in the direction toward the pressure chamber C becomes excessive when no voltage is applied to the piezoelectric element 56.

Such deflection of the vibration plate 55 is caused by the stress remaining in the vibration plate 55. Hereinafter, the deflection of the vibration plate 55 in a state where no voltage is applied to the piezoelectric element 56 may be referred to as "initial deflection".

1-4. Initial Deflection of Vibration Plate

Figure 6:
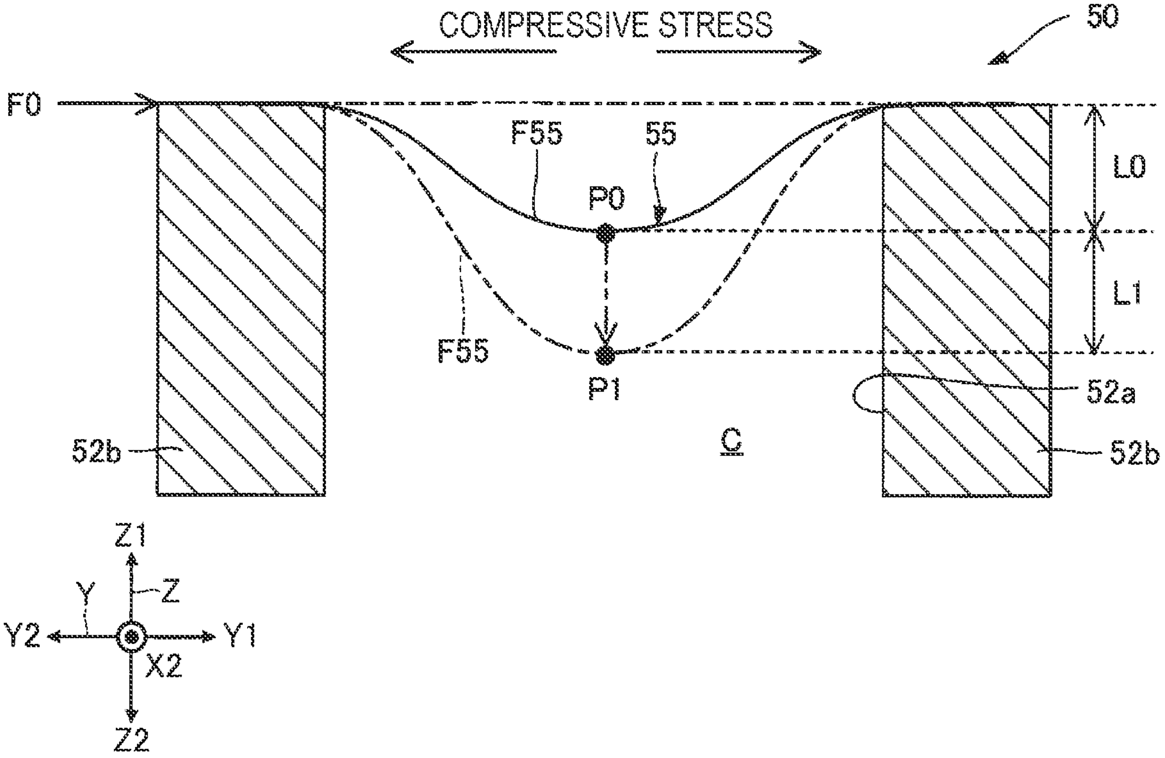
FIG. 6 is a schematic diagram for describing initial deflection of a vibration plate having an excellent compressive stress.
Figure 7:
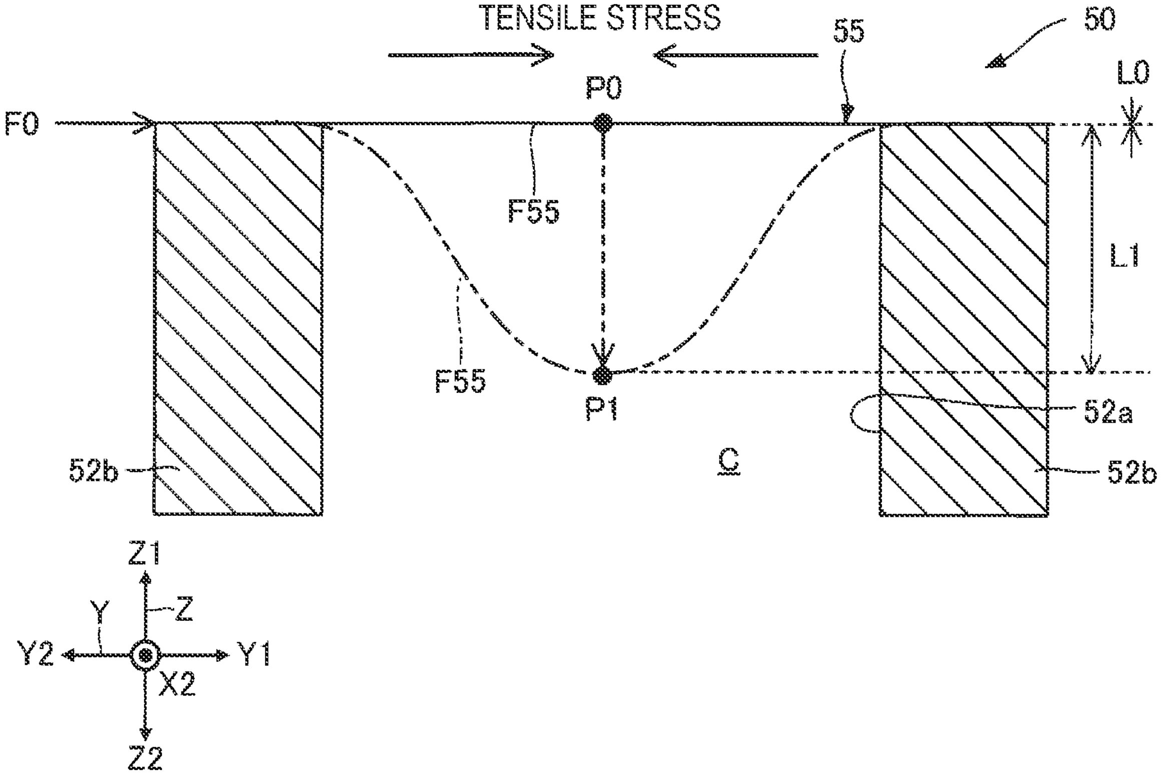
FIG. 7 is a schematic diagram for describing initial deflection of the vibration plate having an excellent tensile stress.

FIG. 6 is a schematic diagram for describing initial deflection of the vibration plate 55 having an excellent compressive stress. FIG. 7 is a schematic diagram for describing initial deflection of the vibration plate 55 having an excellent tensile stress. The "compressive stress" is a stress that causes the film itself to expand. On the other hand, the "tensile stress" is a stress that causes the film itself to contract. In FIGS. 6 and 7, for convenience of description, the piezoelectric element 56 is not illustrated, and a state of initial deflection of the vibration plate 55 is schematically illustrated as a plane F55 of the vibration plate 55 facing the Z2 direction. The plane F55 corresponds to a surface of the vibration region PV illustrated in FIG. 5 described above facing the Z2 direction.

Schematically, the stress remaining in the vibration plate 55 can be regarded as a sum of the stresses of the plurality of films that form the vibration plate 55. Here, when the stress remaining in the vibration plate 55 is a compressive stress, the vibration plate 55 tends to expand, and thus, as illustrated in FIG. 6, the vibration plate 55 deflects in the direction toward the pressure chamber C.

Here, while the piezoelectric element 56 is provided at a position in the Z1 direction with respect to the vibration plate 55, a space called the pressure chamber C exists at the position in the Z2 direction. Therefore, when the vibration plate 55 tends to expand, while the deflection in the Z1 direction is restricted by the piezoelectric element 56, the deflection in the Z2 direction is not restricted, and thus the vibration plate 55 deflects in the Z2 direction instead of in the Z1 direction.

However, since at least a part of the inactive region RE2 of the vibration plate 55 does not have the insulating film 55*c* as described above, the mechanism by which the initial deflection of the vibration plate 55 occurs may be different from an aspect in which both the elastic film 55*a* and the insulating film 55*c* are provided over the entire vibration region PV.

Specifically, in the description, when the film stress of the elastic film 55*a* is a compressive stress and the film stress of the insulating film 55*c* is a tensile stress, the elastic film 55*a* tends to expand, and thus, the elastic film 55*a* tends to deflect in the Z2 direction, which is not restricted by the piezoelectric element 56. The insulating film 55*c* tends to contract, and by contracting the surface of the elastic film 55*a* facing the Z2 direction, the deflection of the elastic film 55*a* in the Z2 direction is promoted. As a result, the vibration plate 55 tends to deflect in the direction toward the pressure chamber C.

On the other hand, when the film stress of the elastic film 55*a* is a tensile stress and the film stress of the insulating film 55*c* is a compressive stress, the elastic film 55*a* tends to contract, and thus, the elastic film 55*a* tends to approach a plane, that is, a reference plane F0, which will be described later, not to deflect. However, the insulating film 55*c* tends to expand, and thus, by expanding the surface of the elastic film 55*a* facing the Z2 direction, the insulating film 55*c* acts on the elastic film 55*a* to deflect in the Z1 direction. Such an action may occur as the elastic film 55*a* is fixed to the partition wall 52*b* of the pressure chamber substrate 52, whereas the insulating film 55*c* is not provided on the arm portion RE2*a*, and the insulating film 55*c* is not fixed to the partition wall 52*b*. As a result, the vibration plate 55 tends to deflect in the direction opposite to the direction toward the pressure chamber C.

The stress remaining in the piezoelectric body 56*b* acts on the vibration plate 55. However, in the present embodiment, the thickness of the piezoelectric body 56*b* is thinner than the thickness of the vibration plate 55 and the temperature during film formation of the piezoelectric body 56*b* can be relatively low, and thus the stress remaining in the piezoelectric body 56*b* is relatively small. Therefore, the influence of the stress remaining in the piezoelectric body 56*b* on the initial deflection of the vibration plate 55 is smaller than the influence of the stress of the plurality of films that form the vibration plate 55 on the initial deflection of the vibration plate 55. Therefore, as will be described later, by defining the stresses of the plurality of films that form the vibration plate 55, the initial deflection of the vibration plate 55 can be sufficiently reduced.

In the example illustrated in FIG. 6, the vibration plate 55 is positioned in the Z2 direction with respect to the reference plane F0 due to the initial deflection. That is, the vibration plate 55 deflects in the direction toward the pressure chamber C due to the initial deflection. For example, this is a case where the film stress of the elastic film 55*a* is a compressive stress and the film stress of the insulating film 55*c* is a tensile stress. Here, the reference plane F0 is a plane defined as a virtual plane including the interface between the pressure chamber substrate 52 and the vibration plate 55. A deflection amount L0 of the vibration plate 55 due to the initial deflection is the distance between a deflection position P0 and the reference plane F0. The deflection position P0 is a position where the plane F55 is farthest from the reference plane F0 in the direction along the Z axis in a state where no voltage is applied to the piezoelectric element 56.

When liquid droplets are discharged from the nozzle N, it is necessary to contract the pressure chamber C by driving the piezoelectric element 56. In FIG. 6, the plane F55 having a deflection amount L1 of the vibration plate 55 necessary for discharging liquid droplets from the nozzle N is illustrated by a two-dot chain line. The deflection amount L1 is a distance between the deflection position P0 and the deflection position P1. The deflection position P1 is a position at which the plane F55 between the pressure chamber C and the vibration plate 55 are the farthest from the reference plane F0 in the Z2 direction in a state where ink is accommodated in the pressure chamber C and a voltage is applied between the first electrode 56*a* and the second electrode 56*c* such that liquid droplets are discharged from the nozzle N.

Here, when the deflection amount L0 in the Z2 direction due to the initial deflection of the vibration plate 55 is large, the deflection amount L1 due to the driving of the piezoelectric element 56 decreases. In other words, when the deflection amount L0 in the Z2 direction is large, the displacement efficiency described later may decrease. This is because, since the deflection amount L0 in the Z2 direction is large, even when the piezoelectric element 56 is driven, the elastic deformation limit of the vibration plate 55 is approached relatively early, and the deflection amount of the vibration plate becomes saturated.

Further, even when the initial deflection of the vibration plate 55 is a deflection in the direction opposite to the direction toward the pressure chamber C as described above, the displacement efficiency described later may decrease. For example, this is a case where the film stress of the elastic film 55*a* is a tensile stress and the film stress of the insulating film 55*c* is a compressive stress. In this case, in order to resist against the action of the tensile stress of the elastic film 55*a* that tends to bring the vibration plate 55 closer to the plane and the action of the compressive stress of the insulating film 55*c* that tends to deflect the vibration plate 55 in the Z1 direction, the piezoelectric element 56 is driven, and thus a large deflection of the vibration plate 55 cannot be obtained as a result, and a displacement efficiency described later may be reduced.

In view of the above problem, the inventors of the present disclosure conducted intensive studies using simulation in order to suppress the excessive initial deflection of the vibration plate 55, and, as a result, it was found that the balance of the film stress between the plurality of films that form the vibration plate 55 was important. Specifically, in the liquid discharge head 50 of the present disclosure, in order to improve the discharge efficiency, the initial deflection of the vibration plate 55 is adjusted to be smaller than that of the related art.

Here, when the compressive stress of the entire vibration plate 55 decreases, the plane F55 of the vibration plate 55 approaches the reference plane F0. For example, when the stress remaining in the entire vibration plate 55 is a tensile stress, the vibration plate 55 contracts. Therefore, as illustrated in FIG. 7, the deflection of the vibration plate 55 in the direction toward the pressure chamber C is reduced. That is, the deflection amount L0 of the vibration plate 55 due to the initial deflection is reduced. As a result, it is possible to suppress the vibration plate 55 from reaching the elastic deformation limit relatively early by driving the piezoelectric element 56, or it is possible to suppress the stress remaining in the vibration plate 55 and the force caused by driving the piezoelectric element 56 from resisting each other, and to increase the displacement efficiency. FIG. 7 illustrates a case where the initial deflection does not occur in the vibration plate 55, and the plane F55 of the vibration plate 55 facing the pressure chamber C matches the reference plane F0.

Even when the vibration plate 55 deflects in the direction toward the pressure chamber C or in the direction separated from the pressure chamber C in a state where no voltage is applied to the piezoelectric element 56, when the degree of deflection is appropriate, the displacement efficiency of the vibration plate 55 due to the driving of the piezoelectric element 56 can be improved. On the other hand, when the deflection of the vibration plate 55 in the direction toward the pressure chamber C in a state where no voltage is applied to the piezoelectric element 56 is excessive, the ratio of the deformation amount of the vibration plate 55 to the force received from the piezoelectric element 56 is no longer linear and becomes saturated, and thus, the force from the piezoelectric element 56 cannot be efficiently converted into the displacement amount of the vibration plate 55. That is, the driving of the piezoelectric element 56 is greatly hindered by the vibration plate 55.

1-5. Film Stress of Each Film of Vibration Plate

Figure 8:
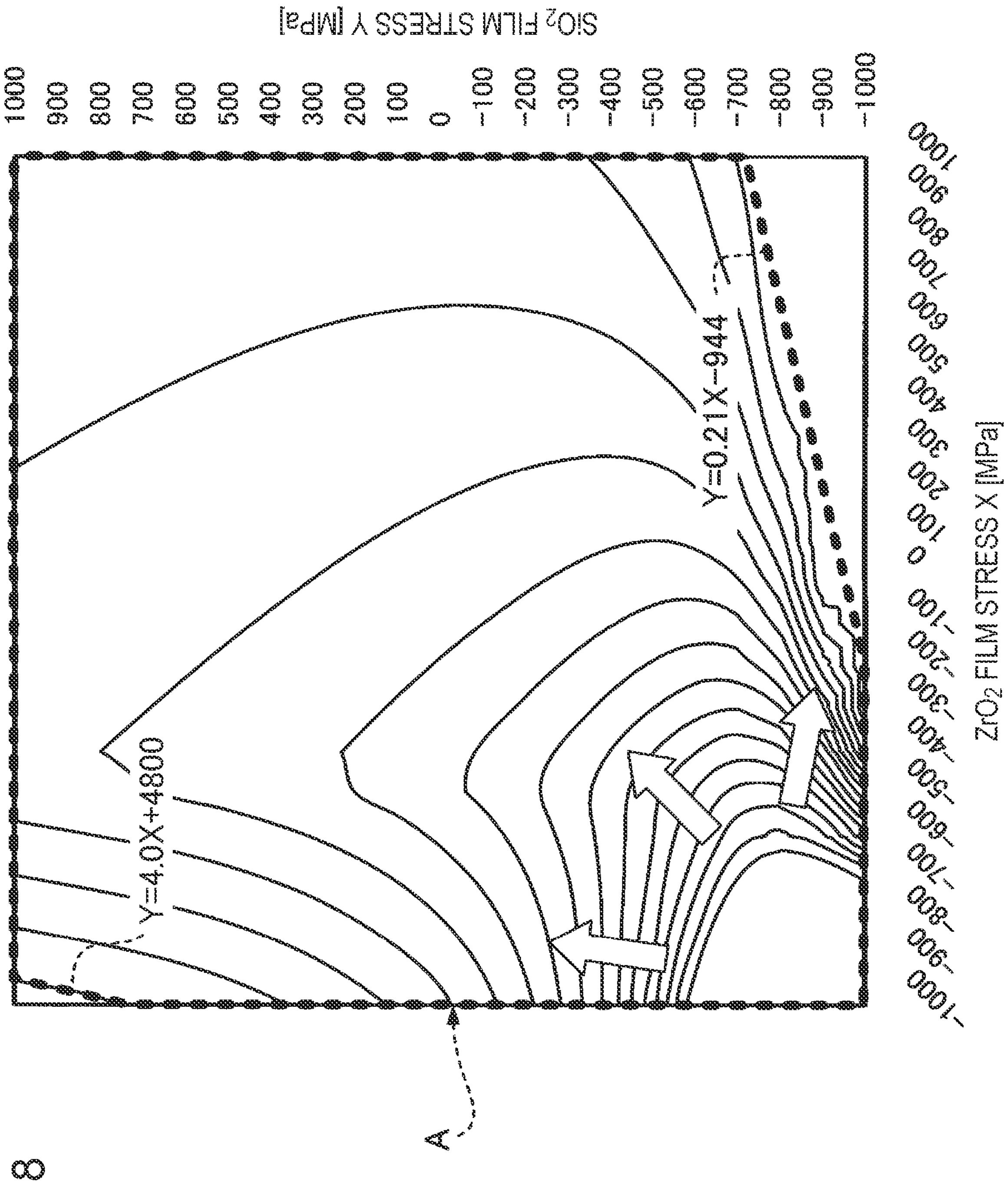
FIG. 8 is a view illustrating a displacement efficiency ratio of a vibration plate based on a relation between a film stress of an elastic film and a film stress of an insulating film.

FIG. 8 is a view illustrating a displacement efficiency ratio of the vibration plate 55 based on the relation between the film stress of the elastic film 55*a* and the film stress of the insulating film 55*c*. In FIG. 8, a vertical axis indicates the film stress of the elastic film 55*a*, and a horizontal axis indicates the film stress of the insulating film 55*c*. In addition, in FIG. 8, the displacement efficiency ratio of the vibration plate 55 is displayed by a solid line like a contour line for each 5%. In the present specification, the compressive stress is represented by a negative value, and the tensile stress is represented by a positive value.

The result of the "displacement efficiency ratio" illustrated in FIG. 8 is the result obtained by simulation. In the simulation, the elastic film 55*a* is a film which has a film thickness of 645 nm and is made of $SiO_2$, the adhesion film 55*b* is a film which has a film thickness of 300 nm and is made of $TiO_2$, and the insulating film 55*c* is a film which has a film thickness of 1065 nm and is made of $ZrO_2$. In addition, in the simulation, the film stress of each of the elastic film 55*a* and the insulating film 55*c* is changed between −1000 MPa and +1000 MPa in a state where the film stress of the adhesion film 55*b* is fixed to +600 MPa.

The "displacement efficiency ratio" is a ratio of the displacement efficiency with respect to the reference while the displacement efficiency of an actuator including an existing piezoelectric element and a vibration plate is set to be a reference (100%).

The displacement efficiency of the actuator is represented by $\delta \times fa^2$. Here, δ is the maximum displacement amount due to the vibration of the actuator, and corresponds to the deflection amount L1 of FIGS. 6 and 7, and fa is the vibration frequency of the actuator. "Maximum displacement amount of the vibration plate due to actuator vibration" can be exchanged with "excluded volume due to the vibration of the actuator" and the like. The maximum displacement amount of the vibration plate due to the vibration of the actuator is within the range of several hundred [nm] or more and several [μm] or less. Further, the vibration frequency of the actuator is approximately several [MHz] at maximum.

In a region A surrounded by the thick broken line in FIG. 8, the displacement efficiency ratio of the vibration plate 55 is 105% or more. Therefore, in the region A, the displacement efficiency can be improved by 5% or more as compared with the existing actuators. In other words, by excluding the region outside the region A, the displacement efficiency can be improved by 5% or more as compared with the existing actuators.

Here, in the upper left region in FIG. 8 of region A, when the film stress of the insulating film 55*c* is X [MPa], the film stress of the elastic film 55*a* is Y [MPa], and the boundary of the displacement efficiency ratio is 105%, the film stress of the insulating film 55*c* and the film stress of the elastic film 55*a* at the boundary are represented by $Y=4.0X-4800$, as illustrated in FIG. 8. Therefore, regarding the film stress of the elastic film 55*a* and the film stress of the insulating film 55*c*, $Y<4.0X+4800$ such that the displacement efficiency ratio is 105% or more. Here, from the viewpoint of preventing cracks of the vibration plate 55, preferably, respectively, $-1000<X<1000$ and $-1000<Y<1000$. An arrow in FIG. 8 indicates that the displacement efficiency ratio decreases in a direction indicated by the arrow.

By satisfying such a relation, it is possible to reduce excessive deflection of the vibration plate 55 in the direction toward the pressure chamber C in a state where no voltage is applied to the piezoelectric element 56. Therefore, the displacement efficiency of the vibration plate 55 can be improved by driving the piezoelectric element 56. As a result, it is possible to provide the liquid discharge head 50 having excellent discharge efficiency.

On the other hand, in the region shifted from the region A to the upper left in FIG. 8, the absolute values of each of the tensile stress of the elastic film 55*a* and the compressive stress of the insulating film 55*c* are extremely large. Therefore, each of the action of the tensile stress of the elastic film 55*a* that tends to approach the plane of the vibration plate 55 and the action of the compressive stress of the insulating film 55*c*, which tends to deflect the vibration plate 55 in the Z1 direction, is extremely large. All of these action act in the direction of hindering the operation of the piezoelectric element 56. As a result, the displacement efficiency of the piezoelectric element 56 decreases.

In addition, when the boundary of the displacement efficiency ratio is set to 105% in the lower right region of the region A in FIG. 8, the film stress of the elastic film 55*a* and the film stress of the insulating film 55*c* at the boundary are represented by $Y=0.21X-944$ as illustrated in FIG. 8. Therefore, regarding the film stress of the elastic film 55*a* and the film stress of the insulating film 55*c*, preferably, $Y>0.21X-944$. In this case, the displacement efficiency of the vibration plate 55 can be further improved by driving the piezoelectric element 56. Here, preferably, respectively, $-1000<X<1000$ and $-1000<Y<1000$.

On the other hand, in the region shifted from the region A to the lower right in FIG. 8, the film stress of the elastic film 55*a* is a compressive stress and the film stress of the insulating film 55*c* is a tensile stress. Therefore, the elastic film 55*a* tends to expand, and thus, the elastic film 55*a* tends to deflect in the Z2 direction, which is not restricted by the piezoelectric element 56. The insulating film 55*c* tends to contract, and by contracting the surface of the elastic film 55*a* facing the Z2 direction, the deflection of the elastic film 55*a* in the Z2 direction is promoted. As a result, the vibration plate 55 tends to deflect in the direction toward the pressure chamber C.

Here, in the region shifted from the region A to the lower right in FIG. 8, the absolute values of each of the compressive stress of the elastic film 55*a* and the tensile stress of the insulating film 55*c* are extremely large. Therefore, each of the action caused by the tensile stress of the elastic film 55*a* that tends to deflect the vibration plate 55 in the Z2 direction and the action caused by the compressive stress of the insulating film 55*c* is extremely large. As a result, the vibration plate 55 is largely deflected in the Z2 direction, and thus the displacement efficiency of the piezoelectric element 56 is lowered.

Figure 9:
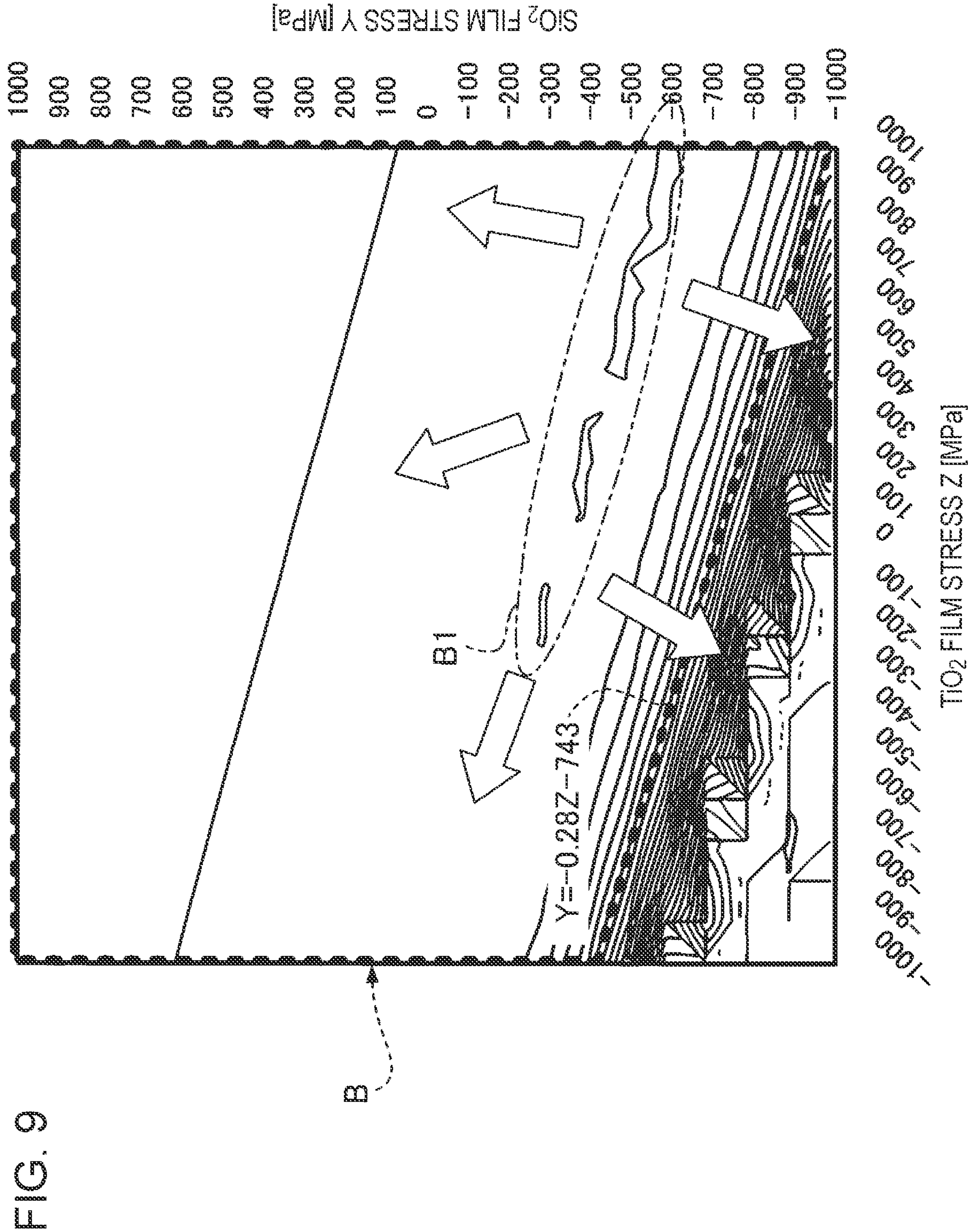
FIG. 9 is a view illustrating a displacement efficiency ratio of a vibration plate based on a relation between a film stress of an elastic film and a film stress of an adhesion film.

FIG. 9 is a view illustrating a displacement efficiency ratio of the vibration plate 55 based on the relation between the film stress of the elastic film 55*a* and the film stress of the adhesion film 55*b*. In FIG. 9, a vertical axis indicates the film stress of the elastic film 55*a*, and a horizontal axis indicates the film stress of the adhesion film 55*b*. In addition, in FIG. 9, the displacement efficiency ratio of the vibration plate 55 is displayed by a solid line like a contour line for each 5%.

The result of the "displacement efficiency ratio" illustrated in FIG. 9 is the result obtained by simulation. In the simulation, the elastic film 55*a* is a film which has a film thickness of 645 nm and is made of $SiO_2$, the adhesion film 55*b* is a film which has a film thickness of 300 nm and is made of $TiO_2$, and the insulating film 55*c* is a film which has a film thickness of 1065 nm and is made of $ZrO_2$. In addition, in the simulation, the film stress of each of the elastic film 55*a* and the adhesion film 55*b* is changed between −1000 MPa and +1000 MPa in a state where the film stress of the insulating film 55*c* is fixed to +100 MPa.

In a region B surrounded by the thick broken line in FIG. 9, the displacement efficiency ratio of the vibration plate 55 is 105% or more. Therefore, in the region B, the displacement efficiency can be improved by 5% or more as compared with the existing actuators. In other words, by excluding the region outside the region B, the displacement efficiency can be improved by 5% or more as compared with the existing actuators.

Here, when the film stress of the elastic film 55*a* is Y [MPa], the film stress of the adhesion film 55*b* is Z [MPa], and the boundary of the displacement efficiency ratio is 105%, the film stress of the elastic film 55*a* and the film stress of the adhesion film 55*b* at the boundary are represented by $Y=-0.28Z-743$, as illustrated in FIG. 9. Therefore, in order to set the displacement efficiency ratio to 105% or more, regarding the film stress of the elastic film 55*a* and the film stress of the adhesion film 55*b*, preferably, $Y>-0.28Z-743$. In this case, in the aspect using the adhesion film 55*b*, it is possible to reduce the excessive deflection of the vibration plate 55 in the direction toward the pressure chamber C in a state where no voltage is applied to the piezoelectric element 56. Therefore, in the aspect using the adhesion film 55*b*, the displacement efficiency of the vibration plate 55 can be improved by driving the piezoelectric element 56. Here, from the viewpoint of preventing cracks of the vibration plate 55, preferably, respectively, $-1000<Y<1000$ and $-1000<Z<1000$.

In addition, in the region B, the displacement efficiency ratio has the peak value in a region B1 surrounded by the one-dot chain line in FIG. 9. Therefore, when the relation between the film stress of the elastic film 55*a* and the film stress of the adhesion film 55*b* is within the region B1, it is easy to increase the displacement efficiency. In FIG. 9, an arrow indicating a direction away from the region B1 indicates that the displacement efficiency ratio decreases as the distance from the region B1 increases.

Above, with reference to FIGS. 8 and 9, the relation of the film stress of the adhesion film 55*b*, the film stress of the insulating film 55*c*, and the film stress of the elastic film 55*a* was described. However, regarding the film stress of the adhesion film 55*b*, the film stress of the insulating film 55*c*, and the film stress of the elastic film 55*a*, preferably, respectively, $-1000<X<1000$, $-1000<Y<1000$, and $-1000<Z<1000$. In this case, since the extreme stress of each film is reduced, it is possible to prevent the occurrence of cracks during the formation of each of the adhesion film 55*b*, the insulating film 55*c*, and the elastic film 55*a*. That is, it is possible to prevent the occurrence of cracks in the vibration plate 55 while reducing the initial deflection of the vibration plate 55.

More preferably, from the viewpoint of better preventing cracks in the vibration plate 55 by reducing the stress difference between the plurality of films that form the vibration plate 55, regarding the film stress of the adhesion film 55*b*, the film stress of the insulating film 55*c*, and the film stress of the elastic film 55*a*, respectively, $-1000<X<0$, $-1000<Y<700$, and $-300<Z<1000$.

As described above, in the liquid discharge head 50, in an aspect in which the insulating film 55*c* is not provided in at least a part of the inactive region RE2, by optimizing the relation between the film stresses of the plurality of films that form the vibration plate 55, it is possible to reduce excessive deflection of the vibration plate 55 in the direction toward the pressure chamber C in a state where no voltage is applied to the piezoelectric element 56. Therefore, the displacement efficiency of the vibration plate 55 can be improved by driving the piezoelectric element 56. As a result, it is possible to provide the liquid discharge head 50 having excellent discharge efficiency.

2. Modification Example

Each of the aspects in the above-described examples can be modified in various manners. Specific modifications according to each of the above-described aspects will be described below. Note that two or more aspects selected in any manner from the following examples can be appropriately combined with each other within a range of not being inconsistent with each other.

2-1. Modification Example 1

In each of the above-described embodiments, the piezoelectric body 56*b* is commonly provided in the plurality of pressure chambers C, but the present disclosure is not limited thereto, and the piezoelectric body 56*b* may be divided for each pressure chamber C. Further, both the first electrode 56*a* and the second electrode 56*c* may be individual electrodes.

2-2. Modification Example 2

Although the serial-type liquid discharge apparatus 100 in which the carriage 41 on which the liquid discharge head 50 is mounted is reciprocated is exemplified in each of the above-described embodiments, the present disclosure can also be applied to a line-type liquid discharge apparatus in which a plurality of nozzles N are distributed over the entire width of the medium M.

2-3. Modification Example 3

The liquid discharge apparatus 100 described in each of the above-described embodiments can be adopted for various devices such as a facsimile machine and a copier in addition to a device dedicated to printing. However, the application of the liquid discharge apparatus of the present disclosure is not limited to printing. For example, a liquid discharge apparatus that discharges a solution of a coloring material is used as a manufacturing device that forms a color filter of a liquid crystal display apparatus. In addition, a liquid discharge apparatus that discharges a solution of a conductive material is used as a manufacturing device that forms a wiring or an electrode on a wiring substrate.

3. Summary of Present Disclosure

A summary of the present disclosure is added below.

(Supplementary note 1) According to a first aspect which is a preferred example of the present disclosure, there is provided a liquid discharge head including: a piezoelectric element having a first electrode, a piezoelectric body, and a second electrode; a pressure chamber substrate provided with a pressure chamber that communicates with a nozzle; and a vibration plate configured to apply a pressure to a liquid in the pressure chamber by vibrating when the piezoelectric element is driven, in which the pressure chamber substrate, the vibration plate, and the piezoelectric element are laminated in this order in a lamination direction, the vibration plate includes an elastic film provided on the pressure chamber substrate, and an insulating film provided between the elastic film and the piezoelectric element, when a part that overlaps the pressure chamber, the first electrode, the piezoelectric body, and the second electrode when viewed in the lamination direction is an active region and a part that overlaps the pressure chamber when viewed in the lamination direction and is different from the active region is an inactive region, in the vibration plate, the elastic film is provided in each of the active region and the inactive region, and the insulating film is provided in the active region and is not provided in at least a part of the inactive region, and $Y<4.0X+4800$, where a compressive stress is represented as a negative value, a tensile stress is represented as a positive value, a film stress of the insulating film is X [MPa], and a film stress of the elastic film is Y [MPa].

In the above first aspect, in the configuration in which the insulating film is not provided in at least a part of the inactive region, regarding the film stress of the elastic film and the film stress of the insulating film, $Y<4.0X+4800$, and accordingly, it is possible to reduce excessive deflection of the vibration plate in the direction toward the pressure chamber in a state where no voltage is applied to the piezoelectric element. Therefore, the displacement efficiency of the vibration plate can be improved by driving the piezoelectric element. As a result, it is possible to provide the liquid discharge head having excellent discharge efficiency.

Here, when the deflection of the vibration plate toward the pressure chamber in a state where no voltage is applied to the piezoelectric element is appropriate, the displacement efficiency of the vibration plate can be improved by driving the piezoelectric element. On the other hand, when the deflection of the vibration plate in the direction toward the pressure chamber in a state where no voltage is applied to the piezoelectric element is excessive, the ratio of the deformation amount of the vibration plate to the force received from the piezoelectric element is no longer linear and becomes saturated, and thus, the force from the piezoelectric element cannot be efficiently converted into the displacement amount of the vibration plate.

Further, in the configuration in which the insulating film is not provided in the inactive region, the strength of the inactive region is weaker than the strength of the active region, and thus the cracks in the vibration plate are likely to occur. In particular, when the thickness of the vibration plate is 5 μm or less, the strength of the vibration plate becomes weak, and thus cracks in the vibration plate are likely to occur. In the related art, from the viewpoint of preventing the occurrence of cracks in the vibration plate, a design was made under the concept that it is better to reduce the stress difference between the elastic film and the insulating film as much as possible. Under such a design concept, the stress balance of the entire vibration plate is unintentionally lost, and as a result, a problem that occurs is that the deflection amount of the vibration plate in the direction toward the pressure chamber becomes excessive when no voltage is applied to the piezoelectric element. Therefore, when the vibration plate has the second part, the effect of satisfying the above-described relation between the film stress of the elastic film and the film stress of the insulating film is remarkably obtained.

(Supplementary note 2) In a second aspect which is a preferred example of the first aspect, regarding the film stress of the elastic film and the film stress of the insulating film, $Y>0.21X-944$. In the above second aspect, the displacement efficiency of the vibration plate can be further improved by driving the piezoelectric element.

(Supplementary note 3) In a third aspect which is a preferred example of the first aspect or the second aspect, a material that forms the elastic film contains one or two or more elements selected from Ti, Si, Al, Ta, Cr, Ir, Hf, Zr, and C, as any of a simple substance, an oxide, or a nitride. In the above third aspect, it is possible to easily satisfy the above-described relation between the film stress of the elastic film and the film stress of the insulating film while realizing the elasticity required for the elastic film.

(Supplementary note 4) In a fourth aspect which is a preferred example of any one of the first aspect to the third aspect, the material that forms the insulating film contains one or two or more elements selected from Ti, Si, Al, Ta, Cr, Ir, Hf, Zr, C, and Pb as any of an oxide or a nitride. In the above fourth aspect, it is possible to easily satisfy the above-described relation between the film stress of the elastic film and the film stress of the insulating film while realizing the insulating property required for the insulating film.

(Supplementary note 5) In a fifth aspect which is a preferred example of any one of the first aspect to the fourth aspect, a thickness of the insulating film is thinner than a thickness of the elastic film. In the above fifth aspect, it is possible to easily satisfy the above-described relation between the film stress of the elastic film and the film stress of the insulating film. However, even when the thickness of the insulating film is equal to or greater than the thickness of the elastic film, by appropriately adjusting the process conditions such as the film formation method or the annealing temperature of each film, it is also possible to satisfy the above-described relation between the film stress of the elastic film and the film stress of the insulating film.

(Supplementary note 6) In a sixth aspect which is a preferred example of any one of the first aspect to the fifth aspect, the vibration plate further includes an adhesion film provided between the elastic film and the insulating film, and $Y>-0.28Z-743$, where a film stress of the adhesion film is Z [MPa]. In the above sixth aspect, in the aspect using the adhesion film, it is possible to reduce the excessive deflection of the vibration plate in the direction toward the pressure chamber in a state where no voltage is applied to the piezoelectric element. Therefore, in the aspect using the adhesion film, the displacement efficiency of the vibration plate can be improved by driving the piezoelectric element.

(Supplementary note 7) In a seventh aspect which is a preferred example of the sixth aspect, a material that forms the adhesion film contains one or two or more elements selected from Ti, Si, Al, Ta, Cr, Ir, Hf, Zr, and C, as any of a simple substance, an oxide, or a nitride. In the above seventh aspect, it is possible to easily satisfy the above-described relation between the film stress of the elastic film or the insulating film and the film stress of the adhesion film while realizing the characteristics required for the adhesion film.

(Supplementary note 8) In an eighth aspect which is a preferred example of the sixth aspect or the seventh aspect, a thickness of the adhesion film is thinner than a thickness of the insulating film. In the above eighth aspect, the above-described relation between the film stress of the insulating film and the film stress of the adhesion film can be easily satisfied. However, even when the thickness of the adhesion film is equal to or greater than the thickness of the insulating film, by appropriately adjusting the process conditions such as the film formation method or the annealing temperature of each film, it is also possible to satisfy the above-described relation between the film stress of the elastic film and the film stress of the insulating film.

(Supplementary note 9) In a ninth aspect which is a preferred example of any one of the sixth aspect to the eighth aspect, regarding the film stress of the adhesion film, the film stress of the insulating film, and the film stress of the elastic film, respectively, $-1000<X<1000, -1000<Y<1000$, and $-1000<Z<1000$. In the above ninth aspect, it is possible to prevent occurrence of cracks during the formation of each of the adhesion film, the insulating film, and the elastic film.

(Supplementary note 10) According to a tenth aspect which is a preferred example of the present disclosure, there is provided a liquid discharge apparatus including: the liquid discharge head according to any one of the above-described first aspect to the ninth aspect; and a control section configured to control driving of the liquid discharge head. In the above tenth aspect, it is possible to provide a liquid discharge apparatus capable having excellent discharge characteristics.

What is claimed is:

1. A liquid discharge head comprising:

a piezoelectric element having a first electrode, a piezoelectric body, and a second electrode;

a pressure chamber substrate provided with a pressure chamber; and a vibration plate configured to apply a pressure to a liquid in the pressure chamber by vibrating when the piezoelectric element is driven, wherein the pressure chamber substrate, the vibration plate, and the piezoelectric element are laminated in this order in a lamination direction, the vibration plate includes an elastic film provided on the pressure chamber substrate, and an insulating film provided between the elastic film and the piezoelectric element, when a part that overlaps the pressure chamber, the first electrode, the piezoelectric body, and the second electrode when viewed in the lamination direction is an active region and a part that overlaps the pressure chamber and is different from the active region when viewed in the lamination direction is an inactive region, in the vibration plate, the elastic film is provided in each of the active region and the inactive region, and the insulating film is provided in the active region and is not provided in a part of the inactive region, and $Y<4.0X+4800$, where a compressive stress is represented as a negative value, a tensile stress is represented as a positive value, a film stress of the insulating film is X [MPa], and a film stress of the elastic film is Y [MPa].

2. The liquid discharge head according to claim 1, wherein regarding the film stress of the elastic film and the film stress of the insulating film, $Y>0.21X-944$.

3. The liquid discharge head according to claim 1, wherein a material that forms the elastic film contains one or two or more elements selected from Ti, Si, Al, Ta, Cr, Ir, Hf, Zr, and C, as any of a simple substance, an oxide, or a nitride.

4. The liquid discharge head according to claim 1, wherein a material that forms the insulating film contains one or two or more elements selected from Ti, Si, Al, Ta, Cr, Ir, Hf, Zr, C, and Pb as any of an oxide or a nitride.

5. The liquid discharge head according to claim 1, wherein a thickness of the insulating film is thinner than a thickness of the elastic film.

6. The liquid discharge head according to claim 1, wherein the vibration plate further includes an adhesion film provided between the elastic film and the insulating film, and $Y>-0.28Z-743$, where a film stress of the adhesion film is Z [MPa].

7. The liquid discharge head according to claim 6, wherein a material that forms the adhesion film contains one or two or more elements selected from Ti, Si, Al, Ta, Cr, Ir, Hf, Zr, and C, as any of a simple substance, an oxide, or a nitride.

8. The liquid discharge head according to claim 6, wherein a thickness of the adhesion film is thinner than a thickness of the insulating film.

9. The liquid discharge head according to claim 6 wherein regarding the film stress of the adhesion film, the film stress of the insulating film, and the film stress of the elastic film, respectively, $-1000<X<1000$, $-1000<Y<1000$, and $-1000<Z<1000$.

10. A liquid discharge apparatus comprising:

the liquid discharge head according to claim 1; and a control section configured to control driving of the liquid discharge head.

* * * * *